United States Patent [19]

Scott, Jr.

[11] 4,152,635
[45] May 1, 1979

[54] BATTERY CHARGER
[75] Inventor: Robert D. Scott, Jr., Costa Mesa, Calif.
[73] Assignee: Research Development Systems, Inc., El Monte, Calif.
[21] Appl. No.: 815,652
[22] Filed: Jul. 14, 1977
[51] Int. Cl.² ............................................. H02J 7/04
[52] U.S. Cl. ...................................... 320/23; 320/32; 320/39
[58] Field of Search .................................. 320/22–24, 320/32, 39, 40

[56] References Cited
U.S. PATENT DOCUMENTS 3,517,295  6/1970  Lapuyade ............................. 320/32
3,699,422  10/1972  Miller et al. ........................... 320/32

*Primary Examiner*—Robert J. Hickey
*Attorney, Agent, or Firm*—John E. Wagner

[57] ABSTRACT

A battery charging circuit employing three operational amplifiers, one to sense charging current and two to regulate constant voltage charging, one for low rate or float level and one for high rate charging. A resistance element acts as part of the current sensing circuit and also limits charge current. A Zener diode provides a voltage reference and aids in sensing deviations of actual terminal voltage from desired terminal voltage to provide feedback control to the voltage regulating operational amplifiers.

8 Claims, 3 Drawing Figures

BATTERY CHARGER

BACKGROUND OF THE INVENTION

Battery charging circuits have long been designed for recharging lead-acid and other types of rechargable cells employing a number of particular well known types of control circuitry. Typically, such chargers require a rectifier, such as a bridge rectifier, to obtain a direct current or interrupted direct current from an alternating source such as line voltage. The rectifier output is coupled to some type of regulation circuit in the form of either a constant voltage regulator or a constant circuit regulator ahead of the cell to be charged. Constant voltage regulators often use a Zener diode as the reference voltage source and may employ a current limiter to limit the charging current to the battery at the near constant voltage. Simple shunt diode circuits having a predetermined forward voltage drop may be used as the simplest form of constant voltage regulator in a charging circuit. It is also been known to employ an operational amplifier in connection with a Zener diode regulated charger.

Another general charger is the constant current charger employing a diode or rectifier and a current limiting resistor. This type of simple constant current charger has one major disadvantage, and that is excessive power loss and heat generated in the current limiting resistor and, in fact, it does not limit current to a constant value.

It has long been recognized that it is desirable for a charger to operate not only to recharge a cell at the most rapid safe rate, but also to maintain a float or trickle charge on the battery at all times. In certain types of cells, such as the lead-gel or lead-dioxide cell, the maintainance of a float potential across the battery terminal produces much longer life and assured full charge whenever required.

Despite this well developed state of the art, I have found that existing charger circuits fail to truly regulate the charging current within allowable limits, both in the charge and float or trickle charge condition, resulting in either the danger of overcharge and gassing or damage to the cell or loss than optimum charging. I have discovered that this occurs because none of the constant voltage chargers which I have been able to analyze actually maintain a constant voltage across the battery terminals or either charge or flow, and even more seriously, do not accurately limit the charging current. Additionally, constant current type chargers, from my examination, do not actually maintain a constant current and further fail to respond to a full charge condition to convert or switch from the full charge to a float condition.

For certain types of cells which have open cells and are charged in a relatively cool location, the deficiencies in charging systems have relatively little noticable effect. When, however, precise batteries such as the lead-gel or lead-lead dioxide cell and other cells which are sealed are improperly charged, irreparable damage to the cell can occur. Faced with these limitations on the prior art, I have invented an improved charging system for batteries.

BRIEF STATEMENT OF THE INVENTION

I have developed a constant voltage type charger which provides actual constant voltage at the terminal of the battery during full charge or float conditions with automatic switching from full charge to float, and from float to full charge. My invention also employs the current sensor which continuously monitors current to the battery which limits the current in both modes of operation. I also employed three operational amplifiers, two of which act as voltage regulators, one in the full charge mode and the other in the float mode, and the third as a battery condition sensor.

More specifically, I have invented a two level constant voltage charger with current sensing to enable high rate charging when the charging current exceeds a predetermined current level and switches to low level or float charge rate when the charging current falls to a second predetermined level. The output terminal voltage is maintained at a required float or high charge rate by an output voltage sensing circuit employing a Zener diode as a voltage reference and a feedback circuit to the pair of voltage regulating operational amplifiers.

BRIEF DESCRIPTION OF THE DRAWINGS

This invention may be more clearly understood from the following detailed description and with reference to the drawing in which.

DETAILED DESCRIPTION OF THE DRAWINGS

Figure 1:
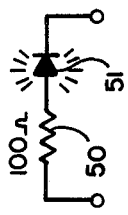
FIG. 1 is the electrical schematic of the preferred embodyment on this invention.

Now referring to FIG. 1 of the drawing, the voltage regulator 10 in accordance with this invention may be seen including a step down transformer 11, a rectifier such as a bridge rectifier 12, a charge current sensing circuit 13, a battery voltage regulator 14 and a pair of operational amplifiers voltage regulators 15 and 16, the former for the low charge rate or float operation and the latter for a highly charged regulation. Additionally a filter capacitor 17 is included at the output of the rectifier 12 to reduce the ripple. A pass transistor 20 applies charging current to the output terminals 21 and 22 to which a battery to be charged is connected by its terminals 23 and 24.

This invention is described in more detail in the embodiment design to recharge a three cell six volt nominal lead-lead dioxide gel type battery for purposes of illustration. It is designed to effectively charge such batteries which are particularly suceptible to overcharging and which may lose charge when on the shelf. It must be recognized that the advantageous features of this charger are directly useful for other types of batteries as well and on other terminal voltages. The charger will work with other types of batteries with only slight changes and may be used to charge batteries of different terminal voltage merely by minor component changes and the single control described below.

Now referring to the circuit in detail, the transformer 11 is merely a step down transformer from the AC line of 115 or 230 volts, to a voltage such as 13 volts which would be adequate to allow the charger to charge batteries of 12 volts or less. Following the transformer 11 is a conventional bridge rectifier employing diodes such as type 1N4001 silicon diodes to provide a full wave rectified alternating current. One side of the bridge is shown at system ground and the opposite side, connects to the input of a current emiting resistor 25 of the current sensing circuit 13. The resistor 25 is connected to the collector of the pass transistor 20 through which current is applied to the output terminal 21. The terminal 22 is at system ground.

The heart of the charger is an array of three operational amplifiers 15 and 16 both of which control the voltage in the float and charging conditions respectively and operational amplifier 30, forming a part of the current sensing circuit 13. These three operational amplifiers are all a part of a single integrated circuit, for example type LM3900 of the National Semi-Conductor Corporation of Sunnyvale, CAL. The output of operational amplifier 15 is continuously connected to the base circuit of transistor 20 via forward poled diode 31. The input terminals of the operational amplifier 15 are connected with its positive to system ground, and its negative to a voltage at a junction A between the first voltage reference diode, namely Zener diode 33 and a second voltage reference diode, namely diode 34. These diodes 33 and 34 plus a trim pot variable resistance 35 between the terminal 21 and terminal 22 and fixed resistances 32 and 36 form a feedback regulation circuit to regulate open circuit voltage at a predetermined level such as 6.83 volts.

The high charge rate voltage regulator, namely operational amplifier 16, has its output circuit connected to the collector of the switching transistor 40 which has its emitter connected in parallel with the output of operational amplifier 15 to the base circuit of transistor 20.

The schematic of FIG. 1 is designed particularly as a recharger for gel-type batteries, such as Model PS-640 six volt batteries of the Power Sonic Corp., 3106 Spring St., Redwood City, CAL., 94063, having a rated capacity of 4.0 amp. hours for a 20 hour rate and having the following specification for charging:

Maximum initial current 0.25 C, where C is the nominal ampere-hour capacity of the battery
Nominal terminal voltage undercharge 2.45 volts per cell at 68° F., (20° C.)
Charge current when fully charged 0.01 C ampere Effective charging is accomplished by the charger of this invention employing the following components in addition to those having numerical designation on the drawing:

Transformer 11; 100–120 volt/13.5 volts at 1 ampere
Resistance 25; 7.5 ohm, 10 watt, 10%
Resistance 32; 1 Megohm, ¼ watt, 5%
Resistance 36; 500 ohm, ¼ watt, 5%
Transistor 20; Type 2N4922
Transistor 40; Type MPS6565
Operational Integrated Circuit LM3900N amplifiers 15, 16, and 30
Zener diode 33; 6.8 volts, 1%
Duide 31; Type I N 914
Diode 34; Type I N 914

It is recognized that for different types of batteries different Zener diodes, and Zener diode 33 in particular, may be used. Particularly, using a precision Zener diode 33, matched to the terminal voltage of the battery B, the trim pot 35 may be eliminated. However, employing the trim pot 35 freedom of selection of the terminal voltage is readily accomplished.

OPERATION

With the charger 10 of this invention connected to an AC supply and its terminals 21 and 22 open circuited, the transistor 40 is in its off or non-conducting condition and the operational amplifier 15 regulates the terminal voltage to the float voltage level, e.g. 6.83 volts for a three cell (nominal 2.45 volts) battery. The current through the system in this standby condition is limited by the resistance 25 to a safe level, e.g. 1 amp.

Figure 2:
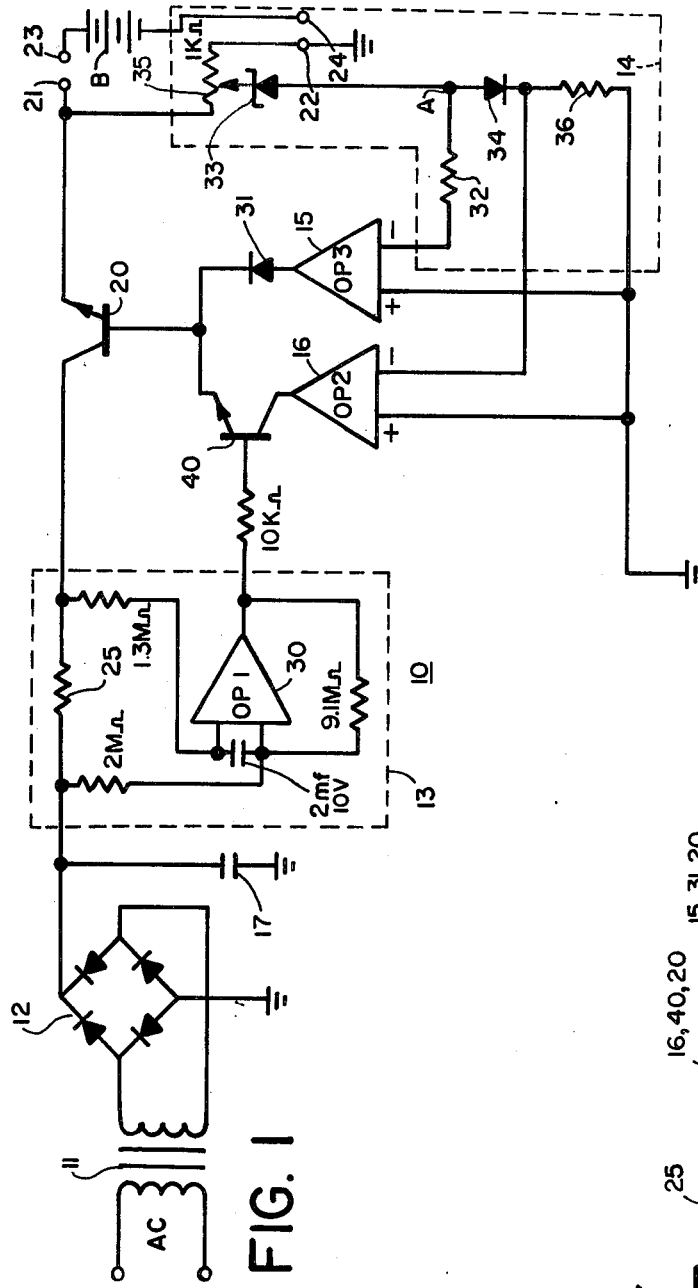
FIG. 2 is a fragmentary circuit drawing of a change to a full charged indication through a visual light.

When a battery B is connected across the terminals 21 and 22, there is an in-rush of current to the battery B because of the difference between the float rate voltage at terminals 21 and 22 and the battery terminals, e.g. 6.83 volts, 6.3 volts, or lower on discharged batteries. The current surge appears across resistance 25. The current sensor 13 employing operational amplifier 30 senses this current and triggers transistor 40 into conduction which allows operational amplifier 16 to regulate the charge voltage at the high rate, e.g. 7.35 volts. If the alternate feature of FIG. 2 is connected across the terminals of resistance 25, the current flow through the parallel path combination of resistance 25 plus resistance 50 and LED 151 results in LED 51 glowing showing high rate charge is flowing. Resistance 25 limits the charge current to a safe value such as 0.25 C or, in the case of the Power Sonic type PS 640 battery described below, to 1.0 amps. The operational amplifier 30 stays triggered by current flow through resistance 25 until the charging current drops to a predetermined level.

As battery B terminal voltage approaches the high charge rate voltage e.g. 7.35 volts, the charging current through resistance 25 starts decreasing.

When the battery terminal voltage reaches the high rate charger terminal voltage, the current through resistance 25 falls below the set point of operational amplifier 30 and it now unlatches turning the transistor 40 off. The set point at which the operational amplifier 30 turns off is the current level through resistance 25 matching the current drawn by a fully charged battery B, e.g. 0.01 C amperes. Current flow can not decrease until the battery voltage reaches the high rate set voltage, e.g. 7.35 volts, which insures a fully charged battery. Operational amplifier 15 which has attempted to regulate the charger terminal voltage to 6.83 volts have been overridden by operational amplifier 16, now regulates the battery at the float rate level.

Current through the resistance 25 during the float condition is low enough to maintain the operational amplifier 30 off and LED 151 not illuminated.

If for any reason the current flow across resistance 25 should increase, for example, if an external load is placed across the battery B, the charger will automatically switch to the high rate again to maintain a fully charged condition on the battery B.

Figure 3:
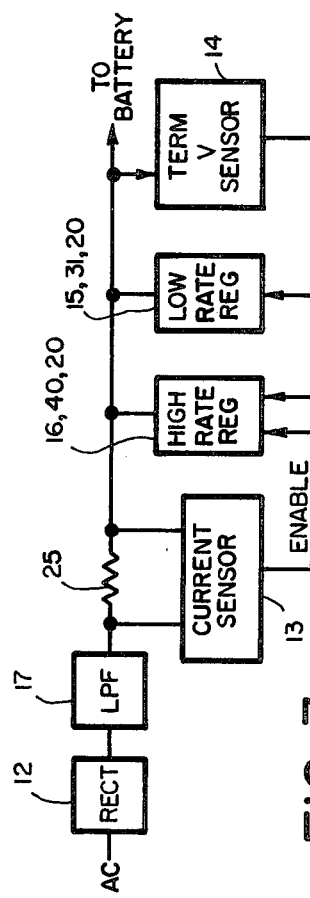
FIG. 3 is a block diagram of this invention.

The interaction of the elements of my combination appear in FIG. 3 in block diagram form. There it may be seen that the rectifier 12 and capacitor 17 provide a relatively low ripple rectified AC current to resistance 25. The current sensor 13 continuously monitors the current through this resistance. The current sensor 13 in turn serves to enable a normally inoperative high rate regulator made up of elements 16, 40, and 20 of FIG. 1, A low rate voltage regulator make up of elements 15, 31, and 20 of FIG. 1 is continuously enabled and on line to establish the terminal voltage when the high rate regulator is disabled. The terminal voltage sensor 14 including the diodes 33 and 34 and associated resistance elements provide a terminal voltage reference, and sensing of variations from the desired terminal voltage. Each of these elements cooperate to provide effective automatic charging without danger of overcharge while providing maximum safe charging rate and continuous float charging for fully charged batteries.

The above described embodyments of this invention are merely descriptive of its principles and are not to be considered limiting. The scope of this invention instead shall be determined from the scope of the following claims, including their equivalents.

I claim:

1. A battery charging circuit comprising:

means for providing a direct current source at a voltage above the terminal voltage of batteries to be charged;

a pair of output terminals to which a battery to be charged may be connected coupled to said last mentioned means;

means for sensing the level of current flowing between direct current source providing means and said pair of output terminals;

a first active voltage regulator for establishing voltage at said output terminals at a predetermined low charge rate voltage above the said desired battery terminal voltage;

a second active voltage regulator for establishing a voltage at said output terminals at a predetermined high charge rate voltage above both said desired battery terminal voltage and the voltage set by said first active voltage regulator;

voltage reference means for establishing a value approximating the desired terminal voltage of a fully charged battery;

means for sensing the voltage across said output terminals;

and means for comparing the level of said voltage references means and said voltage sensing means and for applying a signal to both said first and second active voltage regulators indicative of a deviation of the output terminal voltage from said voltage reference means voltage;

said current sensing means operating to enable said second voltage regulator means when current sensed thereby exceeds a predetermined level.

2. The combination in accordance with claim 1 wherein said current level sensing means comprises a resistance in series with charging current flow path from said direct current source to said output terminals, operational amplifier means responsive to the level of current as sensed to provide an enabling signal to said second active voltage regulator.

3. The combination in accordance with claim 1 wherein said first and second active voltage regulators comprise operational amplifiers.

4. The combination in accordance with claim 1 including switch means controlled by said current sensing means for enabling and disabling said second active voltage regulator.

5. The combination in accordance with claim 4 wherein said first active voltage regulator is connected in parallel with said second active voltage regulator plus said switch means whereby either said first active voltage regulator or said first and said second active voltage regulators are operative to control the voltage of said output terminals.

6. The combination in accordance with claim 1 wherein said voltage reference means includes a Zener diode and means for applying an enabling signal to said first and second active voltage regulator when the output terminal voltage is less than a predetermined value.

7. The combination in accordance with claim 1 wherein said first active voltage regulator establishes a voltage at said output terminals at in the order of the desired float voltage level of the battery to be charged.

8. The combination in accordance with claim 1 wherein said second active voltage regulator establishes the voltage of said output terminals at in the order of the maximum high rate voltage of the battery to be charged.

* * * * *